US009820614B1

(12) United States Patent
Dingler

(10) Patent No.: US 9,820,614 B1
(45) Date of Patent: Nov. 21, 2017

(54) WELDING GROUND DETECTION SYSTEM AND METHOD

(75) Inventor: Johnny W. Dingler, Cullman, AL (US)

(73) Assignee: United Launch Alliance, L.L.C., Centennial, CO (US)

( * ) Notice: Subject to any disclaimer, the term of this patent is extended or adjusted under 35 U.S.C. 154(b) by 1246 days.

(21) Appl. No.: 13/454,719

(22) Filed: Apr. 24, 2012

(51) Int. Cl.
| | |
|---|---|
| *A23L 1/00* | (2006.01) |
| *A23L 1/216* | (2006.01) |
| *A23P 1/10* | (2006.01) |
| *B30B 1/04* | (2006.01) |
| *A47J 43/20* | (2006.01) |
| *B30B 11/04* | (2006.01) |
| *A23L 19/18* | (2016.01) |
| *A23P 30/10* | (2016.01) |
| *A23P 20/20* | (2016.01) |

(52) U.S. Cl.
CPC .............. *A47J 43/20* (2013.01); *A23L 19/18* (2016.08); *A23P 20/20* (2016.08); *A23P 30/10* (2016.08); *B30B 11/04* (2013.01)

(58) Field of Classification Search
CPC .... B23K 9/0209; B23K 9/038; B23K 9/0206; B23K 9/1336; B23K 9/0956; B23K 9/173; B23K 9/0953; F23N 5/123; F23N 2029/12; H02H 1/0015; H02H 2/162; H02H 3/162; H01H 83/04; G01L 1/205; G06F 1/206
USPC ......... 219/136, 137.71, 130.21, 130.01, 408; 361/170, 42, 90, 50; 324/691; 700/300
See application file for complete search history.

(56) References Cited

U.S. PATENT DOCUMENTS

| | | | | |
|---|---|---|---|---|
| 2,632,068 | A | * | 3/1953 | Froebel et al. ............ 200/51.07 |
| RE25,957 | E | * | 2/1966 | Caldwell ........................ 361/215 |
| 4,359,622 | A | * | 11/1982 | Dostoomian et al. ........ 219/110 |
| 4,367,397 | A | * | 1/1983 | Henderson .................... 219/234 |
| 4,507,699 | A | | 3/1985 | Rohm |
| 4,656,336 | A | * | 4/1987 | Goodey ........................ 219/234 |
| 4,996,408 | A | | 2/1991 | Turck et al. |
| 6,283,767 | B1 | * | 9/2001 | Sornes ............................ 439/39 |
| 6,437,951 | B1 | | 8/2002 | Ahlstrom et al. |
| 6,570,130 | B1 | | 5/2003 | Kooken et al. |
| 6,629,021 | B2 | | 9/2003 | Cline et al. |

(Continued)

FOREIGN PATENT DOCUMENTS

DE   1540758   7/1969

OTHER PUBLICATIONS

Bird "Increasing Sensor Life in the Weld-Cell Environment," Metalforming, Oct. 2007, pp. 36-39.

(Continued)

*Primary Examiner* — Dana Ross
*Assistant Examiner* — Kuangyue Chen
(74) *Attorney, Agent, or Firm* — Sheridan Ross P.C.

(57) ABSTRACT

A welding ground detection system and method are provided. In one embodiment, a switch actuator is interconnected to a grounding device and operatively associated with a switch. The switch is electrically connected to an electrical circuit that is operatively associated with the welding equipment. The switch is normally in an open state in which the switch opens the electrical circuit, thereby preventing welding. Upon connection of the grounding device to a workpiece, the switch actuator actuates the switch to a closed state, thereby permitting welding. In one embodiment, detection of a voltage, a current, a resistance, or an impedance of a ground connection is not required to actuate the switch.

20 Claims, 3 Drawing Sheets

(56) References Cited

U.S. PATENT DOCUMENTS

| | | |
|---|---|---|
| 6,646,846 B2 | 11/2003 | Sutton |
| 6,657,163 B1 | 12/2003 | Blankenship et al. |
| 6,914,440 B2 | 7/2005 | Matuschek et al. |
| 6,937,450 B1 | 8/2005 | Mayer et al. |
| 6,961,856 B1 | 11/2005 | Kouropoulus |
| 7,136,267 B2 | 11/2006 | Silverman |
| 7,160,142 B2 * | 1/2007 | Hughes et al. ............... 439/479 |
| 7,170,031 B2 | 1/2007 | Goodwin |
| 7,212,391 B2 | 5/2007 | Cleereman |
| 2007/0158323 A1 | 7/2007 | Enyedy et al. |
| 2007/0257015 A1 * | 11/2007 | Fosbinder et al. ....... 219/130.21 |
| 2010/0051595 A1 * | 3/2010 | Diedrick et al. .......... 219/137 R |
| 2010/0122974 A1 * | 5/2010 | Savopoulos ................. 219/132 |

OTHER PUBLICATIONS

PLK & PLKD Pin Locating Clamps for the Automobile Industry, phd, Apr. 2009, 15 pages.

\* cited by examiner

WELDING GROUND DETECTION SYSTEM AND METHOD

FIELD

The present disclosure is generally related to welding equipment, and more particularly, to a welding ground detection system and method.

BACKGROUND

Electric welding equipment is utilized in a variety of applications. Generally, a welding power supply creates an electric arc between an electrode and a workpiece. The heat generated by the electric arc melts a filler material, which may comprise a consumable electrode, and transfers the filler material to the workpiece. A shielding gas, vapor, and/or slag may be utilized to protect the weld area from atmospheric gases.

Electric welding equipment generally includes a grounding device that connects to the workpiece. If properly connected, the grounding device grounds the workpiece and provides a stable welding environment. However, in some instances, the grounding device is not properly connected to the workpiece. In these instances, the welding power supply may self-adjust the voltage and/or current to maintain the electric arc between the electrode and the workpiece. The voltage and/or current adjustment may result in the weld parameters, for example the voltage, current, and/or weld speed, being outside of a predefined weld parameter range set by the welder before commencing the welding operation, resulting in an unacceptable weld. In extreme circumstances, an improper ground connection between a grounding device and a workpiece may result in an inadvertent arc between the electrode or grounding device and a nearby structure that is not the target of the welding operation and may cause unintended damage to the structure.

To address the aforementioned problems, typical welding ground detection systems and methods detect a voltage, a current, a resistance, and/or an impedance of a ground connection. Upon detection of an improper voltage, current, resistance, and/or impedance, these systems and methods prevent current flow through the welding equipment and thereby shut down the welding operation. For example, U.S. Pat. No. 6,657,163, which is incorporated by reference herein in its entirety, discloses a system for selectively allowing current flow through welding equipment based upon the detected impedance between a grounding device and a welding power supply. Thus, typical welding equipment is operable until an improper voltage, current, resistance, and/or impedance is detected. However, during this time period, which may include a delay between detection and disablement of the equipment, an inadvertent arc may occur. In addition, in some circumstances, welding equipment may be operable even though a grounding device is not connected to a workpiece. For example, a welder may forget to connect a grounding device to a workpiece, resulting in an improperly grounded workpiece. However, if the grounding device is contacting a conductive surface, or if a facility ground is present, the welding detection system and method commonly detects a ground and allows current flow. In many of these circumstances, the welder does not realize the improperly connected grounding device and begins welding, which may result in an unacceptable weld and/or an inadvertent arc between the electrode or grounding device and a nearby structure.

None of the welding ground detection systems or methods currently in existence or otherwise known to those of skill in the art address the aforementioned problems.

SUMMARY

It is an aspect of the present disclosure to disable welding until a grounding device is properly connected to a workpiece. Generally, electric welding equipment includes a welding power supply, an electrical circuit operatively associated with the welding power supply, a welding tool, an electrode lead interconnecting the welding tool to the welding power supply, a grounding device configured to connect to a workpiece, and a workpiece lead interconnecting the grounding device to the welding power supply. According to one embodiment of the present disclosure, a switch is electrically connected to an electrical circuit that is operatively associated with a welding power supply. Generally, the switch may be electrically connected to any electrical circuit that disables welding when in an open state. For example, the switch may be electrically connected to a main power supply electrical circuit, an on/off electrical circuit, a cooling system electrical circuit, a foot pedal electrical circuit, or any other circuit that will disable the welding equipment if the circuit is broken. Thus, when the switch is in an open state, which is the default state, the electrical circuit is broken and the welding equipment is inoperable. In one embodiment, to electrically connect a switch to an electrical circuit, the switch is hard-wired into the electrical circuit. In another embodiment, the switch is wirelessly connected to the electrical circuit.

According to one embodiment of the present disclosure, a switch actuator is operatively associated with a switch. In one configuration, a switch actuator and a switch are integrally connected together as a unitary component and mechanically connected to a grounding device. In another configuration, a switch actuator is mechanically connected to a grounding device and a switch is remotely connected to a switch actuator. For example, the switch actuator may be hard-wired to a remote switch. Alternatively, the switch actuator may be wirelessly connected with a remote switch. In one embodiment, detection of a voltage, a current, a resistance, or an impedance of a ground connection is not required to actuate the switch.

According to one embodiment of the present disclosure, a switch actuator is mechanically connected to a grounding device. In this embodiment, the switch actuator may be selectively connected to the grounding device to actuate a switch. For example, in one configuration, the switch is initially in an open state in which the switch breaks an electrical circuit to disable welding. Upon connection of the grounding device to the workpiece, the switch actuator actuates the switch to a closed state in which the switch may complete the electrical circuit to enable operation of the welding equipment. Switch actuators may include, but are not limited to, contact actuators and/or non-contact actuators. Contact actuators generally contact the workpiece and, in response to the contact, actuate the switch to a closed state. Contact actuators may include, but are not limited to, push buttons, plungers, lever arms, springs, and/or rollers. Non-contact actuators generally detect the presence of the workpiece and, in response to the detection, transmit a signal to a switch that actuates the switch to a closed state. Non-contact actuators may include, for example, various types of sensors. Sensors may include, but are not limited to, optical, electrical, and/or magnetic sensors. Specific sensor examples include, but are not limited to, photoelectric sensors, capacitive proximity sensors, and/or inductive proximity sensors.

The embodiments discussed herein can be modified to be used in association with any electric welding operation including, but not limited to, gas metal arc welding, gas tungsten arc welding, plasma arc welding, and shielded metal arc welding. Similarly, embodiments of the present disclosure may be adapted for use with any type of welding power supply including, but not limited to, a constant current power supply and constant a voltage power supply. Further, embodiments of the present disclosure may be adapted for use with any type of grounding device including, but not limited to, a magnetic ground clamp, a spring-loaded clamp, generally referred to as an alligator clamp, and a c-shaped clamp, generally referred to as a c-clamp.

As used herein, a "welding tool" includes any type of welding gun, torch or tool now known or later developed in the art that performs welding. As used herein, to "disable" or "prevent" welding generally refers to opening an electrical circuit with a switch to thwart generation of a welding arc. As used herein, to "enable" or "permit" welding generally refers to closing a switch that may complete an electrical circuit, which in turn may allow generation of a welding arc. As used herein, a "switch" is a device utilized to interrupt current flow in an electrical circuit. In a "closed" state, the switch makes, or completes, the electrical circuit to allow current flow. In an "open" state, the switch breaks, or opens, the electrical circuit to prevent current flow. Embodiments of the present disclosure may be adapted for use with any type of switch fitting the above description.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the claimed subject matter is intended by either the inclusion or non-inclusion of elements, components, etc. in this Summary. Moreover, reference made herein to "the present invention" or aspects thereof should be understood to mean certain embodiments of the present disclosure and should not necessarily be construed as limiting all embodiments to a particular description.

BRIEF DESCRIPTION OF THE DRAWINGS

The accompanying drawings, which are incorporated in and constitute a part of the specification, illustrate embodiments of the disclosure and together with the general description given above and the detailed description of the drawings given below, serve to explain the principles of these embodiments.

It should be understood that the drawings are not necessarily to scale. In certain instances, details that are not necessary for an understanding of the disclosure or that render other details difficult to perceive may have been omitted. It should be understood, of course, that the claimed invention is not necessarily limited to the particular embodiments illustrated herein.

DETAILED DESCRIPTION

Figure 1:
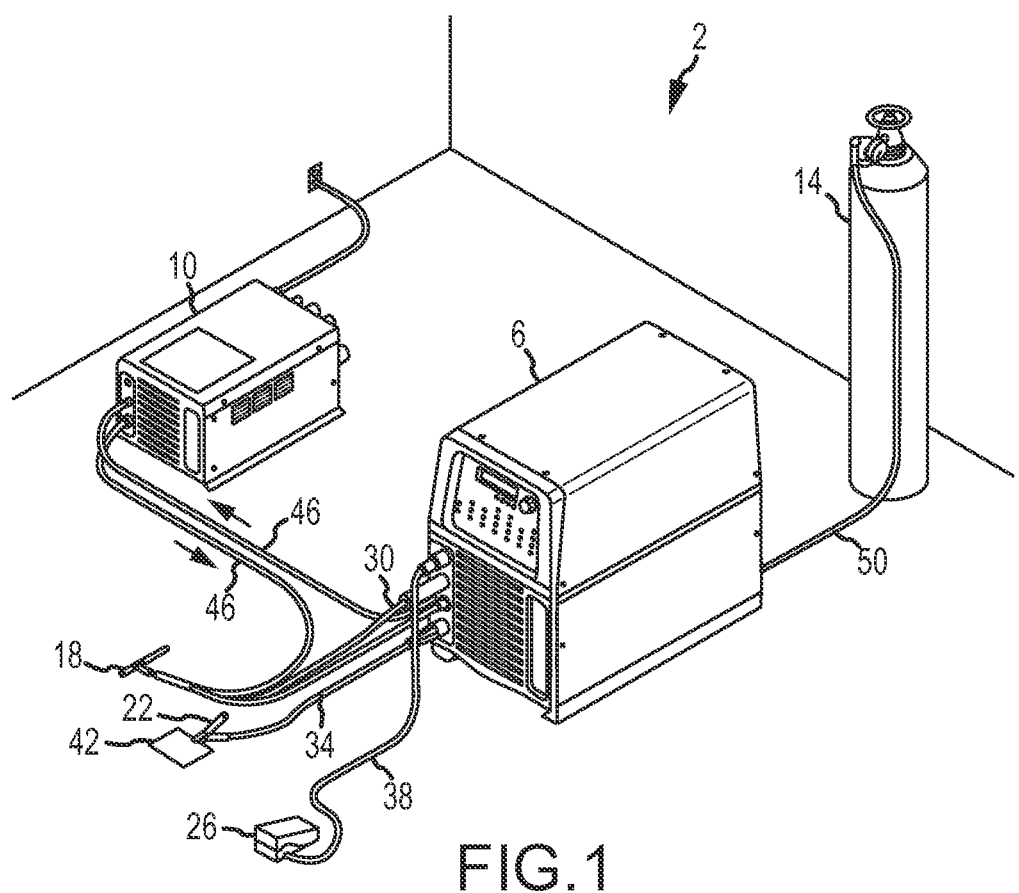
FIG. 1 is a perspective view of one embodiment of a gas tungsten arc welding system.

With reference to FIG. 1, an embodiment of a welding system 2 is shown. FIG. 1 generally depicts a gas tungsten arc welding system 2 comprising a welding power supply 6, a cooling system 10, and a shielding gas supply 14. A welding tool 18, a spring-loaded ground clamp 22, and a foot pedal 26 interconnect to the welding power supply 6 by an electrode lead 30, a workpiece lead 34, and a foot pedal cord 38, respectively. As illustrated, the spring-loaded ground clamp 22 is connected to a workpiece 42. The cooling system 10 is interconnected to the welding tool 18 and the welding power supply 6 by coolant hoses 46. The shielding gas supply 14 is interconnected to the welding power supply 6 and/or the welding tool 18 by a shielding gas hose 50.

In operation, the welding power supply 6 produces energy that is conducted across an arc formed between an electrode, which is associated with the welding tool 18 and the welding power supply 6, and the workpiece 42. A filler metal typically is deposited in a weld area, and a shielding gas protects the weld area from atmospheric contamination. The cooling system 10 circulates cooling fluid through the welding power supply 6 and/or the welding tool 18. Generally, depression of the foot pedal 26 increases the current output of the welding power supply 6.

Generally, the welding power supply 6 is operatively associated with at least one electrical circuit that must be in a closed state for the welding power supply 6 to generate an arc between the welding tool 18 and the workpiece 42. Example electrical circuits include, but are not limited to, a main power supply electrical circuit, an on/off electrical circuit, a cooling system 10 electrical circuit, and a foot pedal 26 electrical circuit 94, shown in FIG. 4. For example, if a foot pedal 26 is utilized with the welding power supply 6, the welding equipment will not generate an arc until a welder closes the foot pedal electric circuit by depressing the foot pedal 26.

According to one embodiment of the present disclosure, a switch is electrically connected to an electrical circuit that is operatively associated with a welding power supply 6. For example, the switch may be connected to an electrical circuit discussed in the previous paragraph. When the switch is in an open state, the electrical circuit is open and prevents welding. For example, if a foot pedal 26 is utilized with the welding power supply 6 and a switch is electrically connected to the foot pedal electrical circuit, the switch will disable welding even if a welder depresses the foot pedal 26. To enable welding, in this example, the foot pedal 26 must be depressed and the switch must be separately actuated.

Figure 2:
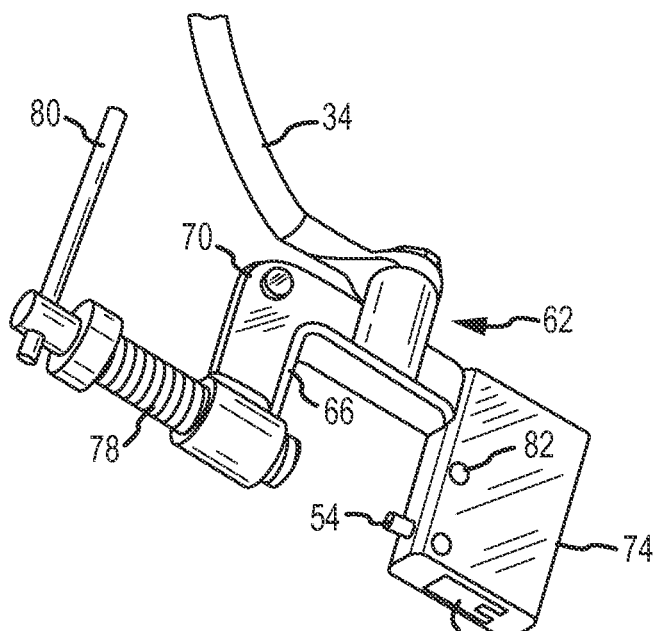
FIG. 2 is a perspective view of one embodiment of a switch mechanically connected to a c-shaped ground clamp.

Referring to FIG. 2, one embodiment of a switch actuator 54 and a switch 58 mechanically connected to a c-shaped ground clamp 62 is provided. As illustrated, the switch actuator 54 and the switch 58 are connected together as a unitary component. The c-shaped ground clamp 62 includes a c-shaped frame comprising a flange 66 having three sides configured in a c-shape and a rib 70 extending perpendicular to the flange 66 on two sides of the flange 66. A cover 74 connects the switch actuator 54 and the switch 58 to the non-rib side of the flange 66. As connected, the switch actuator 54 extends through an aperture formed in the non-rib side of the flange 66. To connect the c-shaped ground clamp 62 to a workpiece, a workpiece is placed between the non-rib side of the flange 66 and an adjustable screw 78. The adjustable screw 78 threadably engages a threaded aperture formed in the c-shaped clamp 62. As the adjustable screw 78 is displaced towards the non-rib side of the flange 66 by rotating a handle 80 about an axial axis of the threaded aperture, the adjustable screw 78 will contact the workpiece, which in turn will depress the switch actuator 54. Upon depression, the switch actuator 54 actuates the switch 58 from an open state, in which the switch prevents welding, to a closed state, in which the switch permits welding.

As depicted in FIG. 2, the switch actuator 54 and the switch 58 comprise a plunger-actuated limit switch. As discussed previously, various types of switch actuators and switches may be utilized. As depicted, fasteners 82 connect the cover 74 to the flange 66. Alternative connection methods may be utilized including, but not limited to, adhesives and welding. In addition, the switch actuator 54 and the switch 58 may be interconnected to the c-shaped clamp 62 in various positions. For example, in an alternative embodiment, the switch actuator 54 and the switch 58 may be positioned adjacent to the flange 66. In this alternative embodiment, an L-shaped bracket, for example, may be utilized to connect the switch actuator 54 and the switch 58 to the c-shaped clamp 62. As discussed previously, in one embodiment, the switch actuator 54 is connected to a grounding device and the switch 58 is remotely connected to the switch actuator 54.

Figure 3:
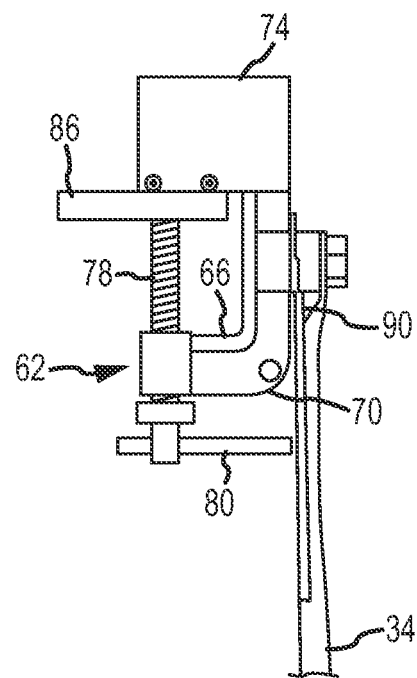
FIG. 3 is an elevation view of the c-shaped ground clamp of FIG. 2 connected to a workpiece.

Referring now to FIG. 3, an elevation view of the c-shaped ground clamp 62 connected to a workpiece 86 is provided. As illustrated, the workpiece 86 is secured between the adjustable screw 78 and the flange 66 of the c-shaped ground clamp 62. The workpiece 86 has depressed the switch actuator 54, thereby actuating the switch 58 to a closed state. A wire 90 is connected to the switch 58, which is covered by the cover 74. The wire 90 electrically connects the switch 58 to an electrical circuit that is operatively associated with the welding power supply 6. Generally, if a grounding device is properly secured to the workpiece 86, the switch actuator 54 actuates the switch 58 to a closed state, which in turn may complete the electrical circuit and enable welding. If the grounding device is not properly secured to the workpiece 86, the switch actuator 54 will not actuate the switch 58 to a closed state, thereby disabling welding.

Figure 4:
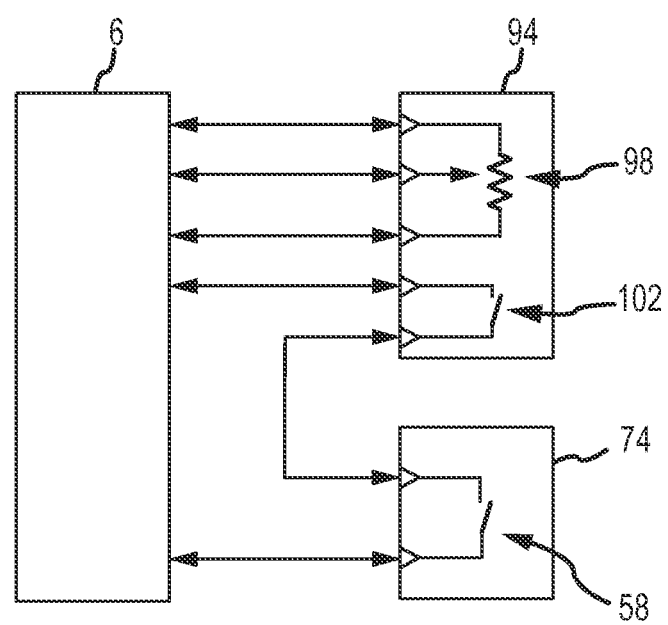
FIG. 4 is a wiring schematic of one embodiment of a switch electrically integrated into a foot pedal electrical circuit.

FIG. 4 illustrates a wiring schematic of one embodiment of a switch 58 electrically connected to a simplified foot pedal electrical circuit 94. As illustrated, the simplified foot pedal electrical circuit 94 includes a potentiometer 98 and a switch 102, both of which are electrically connected to a welding power supply 6. When the foot pedal 26, shown in FIG. 1, is depressed, the switch 102 closes and typically would complete the foot pedal electrical circuit 94. However, in FIG. 4, the switch 58 is electrically connected to the switch 102 and prevents completion of the foot pedal electrical circuit 94 until the switch 58 is closed. As previously discussed, in one embodiment, a switch actuator 54 is connected to a grounding device and actuates the switch 58 to a closed state upon connection of the grounding device to a workpiece. In this fashion, the switch 58 disables welding until a grounding device is properly connected to a workpiece. Also, as previously discussed, the switch 58 can be electrically connected to various electrical circuits that are operatively associated with a welding power supply 6. For example, the switch 58 may be electrically connected to a main power supply electrical circuit, an on/off electrical circuit, a cooling system electrical circuit, or any other electrical circuit that must be completed to enable welding. Generally, when the switch 58 is in an open state, the electrical circuit is broken, thereby disabling welding. The switch 58 can be hard-wired or wirelessly connected to the electrical circuit.

According to one embodiment of the present disclosure, a welding ground detection method comprises obtaining a welding power supply 6, a grounding device configured to connect to the workpiece, a switch actuator 54, and a switch 58; mechanically connecting the switch actuator 54 to the grounding device; operatively associating a switch 58 with the switch actuator 54; and electrically connecting the switch 58 to an electrical circuit associated with the welding power supply 6. In one configuration, the switch is normally in an open state in which the electrical circuit is open and disables welding. In another configuration, when the grounding device is connected to the workpiece 86, the switch actuator 54 actuates the switch 58 to a closed state to permit welding. In one embodiment, detection of a voltage, a current, a resistance, or an impedance of the ground connection is not required to actuate the switch 58.

While various embodiments have been described in detail, it is apparent that modifications and alterations of those embodiments will occur to those skilled in the art. It is to be expressly understood that such modifications and alterations are within the scope and spirit of the claimed invention, as set forth in the following claims.

What is claimed is:

1. A welding ground detection system configured to prevent operation of welding equipment based on the lack of a ground connection with a workpiece, the welding equipment including a welding power supply, a welding tool, an electrode lead interconnecting the welding tool and the welding power supply, a workpiece lead interconnected to the welding power supply, and an electrical circuit operatively associated with the welding power supply and configured to disable welding when the electrical circuit is open, the welding ground detection system comprising:
   a grounding device interconnected to a work piece lead and configured to connect to the workpiece;
   a switch actuator mechanically connected to the grounding device; and
   a switch operatively associated with the switch actuator and electrically connected to the electrical circuit, wherein the switch is normally in an open state in which the electrical circuit is open and disables welding, and wherein when the grounding device is connected to the workpiece, the switch actuator actuates the switch to a closed state to permit welding.

2. The welding ground detection system of claim 1, wherein detection of a voltage, a current, a resistance, or an impedance of the ground connection is not required to actuate the switch.

3. The welding ground detection system of claim 1, further comprising a foot pedal interconnected to the welding power supply, and wherein the electrical circuit comprises a foot pedal actuated electrical circuit.

4. The welding ground detection system of claim 1, wherein the grounding device comprises a c-shaped ground clamp.

5. The welding ground detection system of claim 1, wherein the grounding device comprises a spring-loaded ground clamp.

6. The welding ground detection system of claim 1, wherein the switch physically contacts the switch actuator.

7. The welding ground detection system of claim 6, wherein the switch actuator is a plunger.

8. The welding ground detection system of claim 1, wherein the switch is located at a position physically separate from the switch actuator, wherein the switch is wirelessly connected to the switch actuator, and wherein the switch actuator comprises a sensor configured to detect the workpiece and actuate the switch.

9. The welding ground detection system of claim 1, wherein the switch is hard-wired into the electrical circuit.

10. A welding ground detection system configured to prevent operation of welding equipment based on the lack of a ground connection with a workpiece, the welding ground detection system comprising:
- a welding power supply;
- an electrical circuit operatively associated with the welding power supply and configured to disable welding when the electrical circuit is open;
- a first switch operationally associated with the electrical circuit, the switch configured to place the electrical circuit in an open or closed state;
- a first switch actuator associated with the first switch and configured to open and close the first switch;
- a welding tool for welding the workpiece;
- an electrode lead interconnecting the welding tool and the welding power supply;
- a grounding device configured to connect to the workpiece;
- a workpiece lead interconnecting the grounding device and the welding power supply;
- a second switch actuator mechanically connected to the grounding device; and
- a second switch operatively associated with the second switch actuator and electrically connected to the electrical circuit, wherein the second switch is normally in an open state in which the electrical circuit is open and disables welding, and wherein when the grounding device is connected to the workpiece, the second switch actuator actuates the second switch to a closed state to permit welding.

11. The welding ground detection system of claim 10, wherein detection of a voltage, a current, a resistance, or an impedance of the ground connection is not required to actuate the second switch.

12. The welding ground detection system of claim 10, further comprising a foot pedal interconnected to the welding power supply, and wherein the electrical circuit comprises a foot pedal electrical circuit.

13. The welding ground detection system of claim 10, wherein the grounding device comprises a c-shaped ground clamp.

14. The welding ground detection system of claim 10, wherein the grounding device comprises a spring-loaded ground clamp.

15. The welding ground detection system of claim 10, wherein the second switch is mechanically connected to the second switch actuator.

16. The welding ground detection system of claim 15, wherein the second switch actuator is a plunger.

17. The welding ground detection system of claim 10, wherein the second switch is located at a position physically separate from the second switch actuator and is directly connected to the second switch actuator from a remote location.

18. The welding ground detection system of claim 17, wherein the second switch actuator comprises a sensor configured to detect the workpiece and actuate the second switch.

19. The welding ground detection system of claim 10, wherein the second switch is hard-wired into the electrical circuit.

20. A welding ground detection method for preventing operation of welding equipment based on the lack of a ground connection with a workpiece, the method comprising:
- obtaining a welding power supply, a grounding device configured to connect to the workpiece, a switch actuator, and a switch;
- mechanically connecting the switch actuator to the grounding device;
- operatively associating a switch with the switch actuator; and
- electrically connecting the switch to an electrical circuit associated with the welding power supply, wherein the switch is normally in an open state in which the electrical circuit is open and disables welding, wherein when the grounding device is connected to the workpiece, the switch actuator actuates the switch to a closed state to permit welding, and wherein detection of a voltage, a current, a resistance, or an impedance of the ground connection is not required to actuate the switch.

* * * * *